(12) United States Patent
Garcia et al.

(10) Patent No.: US 8,488,295 B2
(45) Date of Patent: Jul. 16, 2013

(54) SELECTIVELY RIGIDIZABLE AND ACTIVELY STEERABLE ARTICULATABLE DEVICE

(75) Inventors: Pablo Garcia, Menlo Park, CA (US); Thomas Low, Belmont, CA (US); Bryan Chavez, Palo Alto, CA (US); Harsha Prahlad, Cupertino, CA (US)

(73) Assignee: SRI International, Menlo Park, CA (US)

( * ) Notice: Subject to any disclaimer, the term of this patent is extended or adjusted under 35 U.S.C. 154(b) by 12 days.

(21) Appl. No.: 13/399,618

(22) Filed: Feb. 17, 2012

(65) Prior Publication Data

US 2012/0144950 A1 Jun. 14, 2012

Related U.S. Application Data

(62) Division of application No. 12/180,438, filed on Jul. 25, 2008, now Pat. No. 8,125,755.

(60) Provisional application No. 60/952,162, filed on Jul. 26, 2007.

(51) Int. Cl.
*A61B 1/005* (2006.01)

(52) U.S. Cl.
USPC ............ 361/233; 600/116; 600/118; 600/125

(58) Field of Classification Search
USPC .......................... 361/233; 600/116, 118, 125
See application file for complete search history.

(56) References Cited

U.S. PATENT DOCUMENTS

| 3,882,852 | A |   | 5/1975  | Sinnreich |         |
|-----------|---|---|---------|-----------|---------|
| 4,794,912 | A |   | 1/1989  | Lia       |         |
| 4,815,450 | A |   | 3/1989  | Patel     |         |
| 4,934,786 | A | * | 6/1990  | Krauter   | 385/118 |
| 4,964,062 | A | * | 10/1990 | Ubhayakar et al. | 700/249 |
| 5,018,506 | A |   | 5/1991  | Danna et al. |    |
| 5,251,611 | A |   | 10/1993 | Zehel et al. |    |
| 5,337,733 | A |   | 8/1994  | Bauerfeind et al. | |
| 5,398,670 | A | * | 3/1995  | Ortiz et al. | 600/114 |
| 5,996,346 | A |   | 12/1999 | Maynard   |         |
| 6,007,482 | A |   | 12/1999 | Madni et al. |    |

(Continued)

FOREIGN PATENT DOCUMENTS

| JP | 5-253175         | 10/1993 |
|----|------------------|---------|
| WO | WO 2005/089176 A2 | 9/2005  |
| WO | 2007/033379      | 3/2007  |

OTHER PUBLICATIONS

Office Action dated Aug. 6, 2012 in U.S. Appl. No. 12/180,387.

(Continued)

*Primary Examiner* — Rexford Barnie
*Assistant Examiner* — Zeev V Kitov
(74) *Attorney, Agent, or Firm* — Beyer Law Group LLP

(57) ABSTRACT

A selectively rigidizable and actively steerable device is described. In one aspect, an articulatable device is described that includes a flexible inner tube having a first lumen, a flexible outer tube that receives the inner tube, and a multiplicity of overlapping, rigidizable scale-like strips. Each scale-like strip is coupled with the inner tube and positioned between the inner and outer tubes. Of particular note, the overlapping strips are actuatable between a non-rigidized state in which overlapping strips are slideable relative to one another and a rigidized state in which overlapping strips are not slideable relative to one another.

32 Claims, 12 Drawing Sheets

U.S. PATENT DOCUMENTS

| | | |
|---|---|---|
| 6,468,203 B2 | 10/2002 | Belson |
| 6,485,409 B1 | 11/2002 | Voloshin et al. |
| 6,837,846 B2 | 1/2005 | Jaffe et al. |
| 6,960,163 B2 | 11/2005 | Ewers et al. |
| 7,041,052 B2 | 5/2006 | Saadat et al. |
| 7,128,708 B2 | 10/2006 | Saadat et al. |
| 7,338,505 B2 | 3/2008 | Belson |
| 7,598,651 B2 | 10/2009 | Kornbluh et al. |
| 7,598,652 B2 | 10/2009 | Kornbluh et al. |
| 8,125,755 B2 | 2/2012 | Garcia et al. |
| 2002/0120178 A1 | 8/2002 | Tartaglia et al. |
| 2005/0234297 A1 | 10/2005 | Devierre et al. |
| 2005/0245789 A1 | 11/2005 | Smith et al. |
| 2005/0250990 A1 | 11/2005 | Le et al. |
| 2006/0058582 A1 | 3/2006 | Maahs et al. |
| 2006/0111614 A1 | 5/2006 | Saadat et al. |
| 2006/0183974 A1 | 8/2006 | Levy et al. |
| 2006/0192465 A1 | 8/2006 | Kornbluh et al. |
| 2006/0252989 A1 | 11/2006 | Bar-Or et al. |
| 2006/0258912 A1 | 11/2006 | Belson et al. |
| 2006/0287666 A1 | 12/2006 | Saadat et al. |
| 2007/0079924 A1 | 4/2007 | Saadat et al. |
| 2007/0118015 A1 | 5/2007 | Wendlandt |
| 2007/0123840 A1 | 5/2007 | Cox |
| 2008/0089002 A1 | 4/2008 | Pelrine et al. |
| 2009/0030282 A1 | 1/2009 | Garcia et al. |

OTHER PUBLICATIONS

Notice of Allowance dated Jan. 22, 2013 in U.S. Appl. No. 12/180,387.

International Search Report dated Nov. 10, 2008 in PCT Application No. PCT/US2008/071265.

Written Opinion dated Nov. 10, 2008 in PCT Application No. PCT/US2008/071265.

International Search Report dated Nov. 7, 2008 in PCT Application No. PCT/US2008/071267.

Written Opinion dated Nov. 7, 2008 in PCT Application No. PCT/US2008/071267.

U.S. Appl. No. 12/180,387, filed Jul. 25, 2008.

* cited by examiner ic # SELECTIVELY RIGIDIZABLE AND ACTIVELY STEERABLE ARTICULATABLE DEVICE

CROSS-REFERENCE TO RELATED APPLICATION

This application is a Divisional of U.S. application Ser. No. 12/180,438 filed on Jul. 25, 2008, which claims priority under 35 U.S.C. §119(e) from U.S. Provisional Patent Application No. 60/952,162 filed Jul. 26, 2007, which are hereby incorporated by reference herein for all purposes.

FIELD OF THE INVENTION

The present invention generally relates to articulatable devices and, particularly, to articulatable devices that are selectively rigidizable and actively steerable.

BACKGROUND OF THE INVENTION

There are an increasing number of applications where articulatable devices are desirable. By way of example, robotic arms having one or more joints have been used in numerous manufacturing processes as well as in more complex applications such as in outer space or for exploratory or investigative purposes in places where it may be impossible, unsafe or undesirable for humans to go. Conventional articulatable arms and other devices are often heavy and even bulky as a result of the device having to be strong or rigid enough to support not only its own weight, especially as they become increasingly longer (and hence must support a greater bending moment), as well as the weight of anything that the device may be carrying.

While existing devices may be suitable in specific applications, more mobile, configurable and lightweight articulatable devices are desirable.

SUMMARY OF THE INVENTION

The present invention provides a selectively rigidizable and actively steerable articulatable device. In one aspect, an articulatable device is described that includes a flexible inner tube having a first lumen, a flexible outer tube that receives the inner tube, and a multiplicity of overlapping, rigidizable scale-like strips. Each scale-like strip is coupled with the inner tube and positioned between the inner and outer tubes. Of particular note, the overlapping strips are actuatable between a non-rigidized state in which overlapping strips are slideable relative to one another and a rigidized state in which overlapping strips are not slideable relative to one another.

In various preferred embodiments, the scale-like strips are arranged in a multiplicity of independently actuatable groups. In other embodiments, each strip may be individually addressable and actuatable. A variety of means may be used to actuate the strips from the non-rigidized state to the rigidized state. Generally, selected overlapping strips are rigidized by selectively controlling frictional forces between adjacent overlapping strips. By way of example, various electrostatic or pneumatic systems may be utilized to force overlapping strips together and increase the friction therebetween.

In another aspect, a method is disclosed for selectively rigidizing an articulatable device such as that just described. Generally, the method includes applying an electric field across selected adjacent ones of the overlapping scale-like strips. The electric field results in an electrostatic attraction that forces the selected adjacent ones of the overlapping strips together thereby increasing the frictional forces between the selected adjacent ones of the overlapping strips such that the selected strips are not substantially slideable relative to one another. Consequently, the portion of the inner tube adjacent the selected strips becomes rigidized.

In still another aspect, a method for steering an articulatable device at a predetermined region along the length of the device is described. Broadly, the method involves selectively rigidizing a portion of the device diametrically adjacent the predetermined region and elevating the pressure within an inner lumen of the device such that a portion of the device diametrically opposite the rigidized portion expands while the rigidized portion is substantially prevented from expanding. As a result, the device is curved around the rigidized portion thereby steering the device.

These and other features and advantages of the present invention will be described in the following description of the invention and associated figures.

BRIEF DESCRIPTION OF THE DRAWINGS

The invention and the advantages thereof may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION OF EXAMPLE EMBODIMENTS

The present invention generally relates to articulatable devices and tools and, particularly, to articulatable devices that are selectively rigidizable and/or actively steerable. As will be apparent from the following description, the ability to actively and selectively rigidize all or portions of an articulatable device affords many advantages and enables a variety of previously unfeasible applications. More specifically, such an articulatable device may be rigidized along a desired length of the device and at a specific region around the circumference of the device. The rigidized portion is prevented or significantly inhibited from elongating or contracting while other portions of the device, including the portion diametrically opposite the rigidized portion, remain longitudinally flexible, which can help facilitate bending and thus steering of the device around the rigidized portion. Additionally, upon full deployment of the articulatable device, the entire rigidizable portion of the device may be rigidized thereby providing a firm platform from which to perform various procedures and/or along which to pass various other tools and instruments. Of particular note, the articulatable devices described herein may generally be rigidized in any configuration; that is, the devices may be rigidized to maintain virtually any shape, however convoluted, that the device was in prior to rigidization.

A variety of methods and structures for selectively rigidizing various articulatable devices will be described below. Broadly, the invention utilizes control over the frictional forces between overlapping elements arranged on the device to selectively prevent or inhibit movement between adjacent overlapping elements thereby controllably and selectively rigidizing a desired portion of the device. In particular embodiments, the aforementioned elements take the form of thin scale-like strips arranged around the circumference and along the length of a flexible tube. A variety of means are described for increasing the friction between these scale-like strips including, by way of example, electrostatic attraction as well as various mechanical mechanisms such as compressing overlapping strips together via pneumatic systems.

Various aspects of the present invention are described in detail with reference to various example embodiments as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Figure 1:
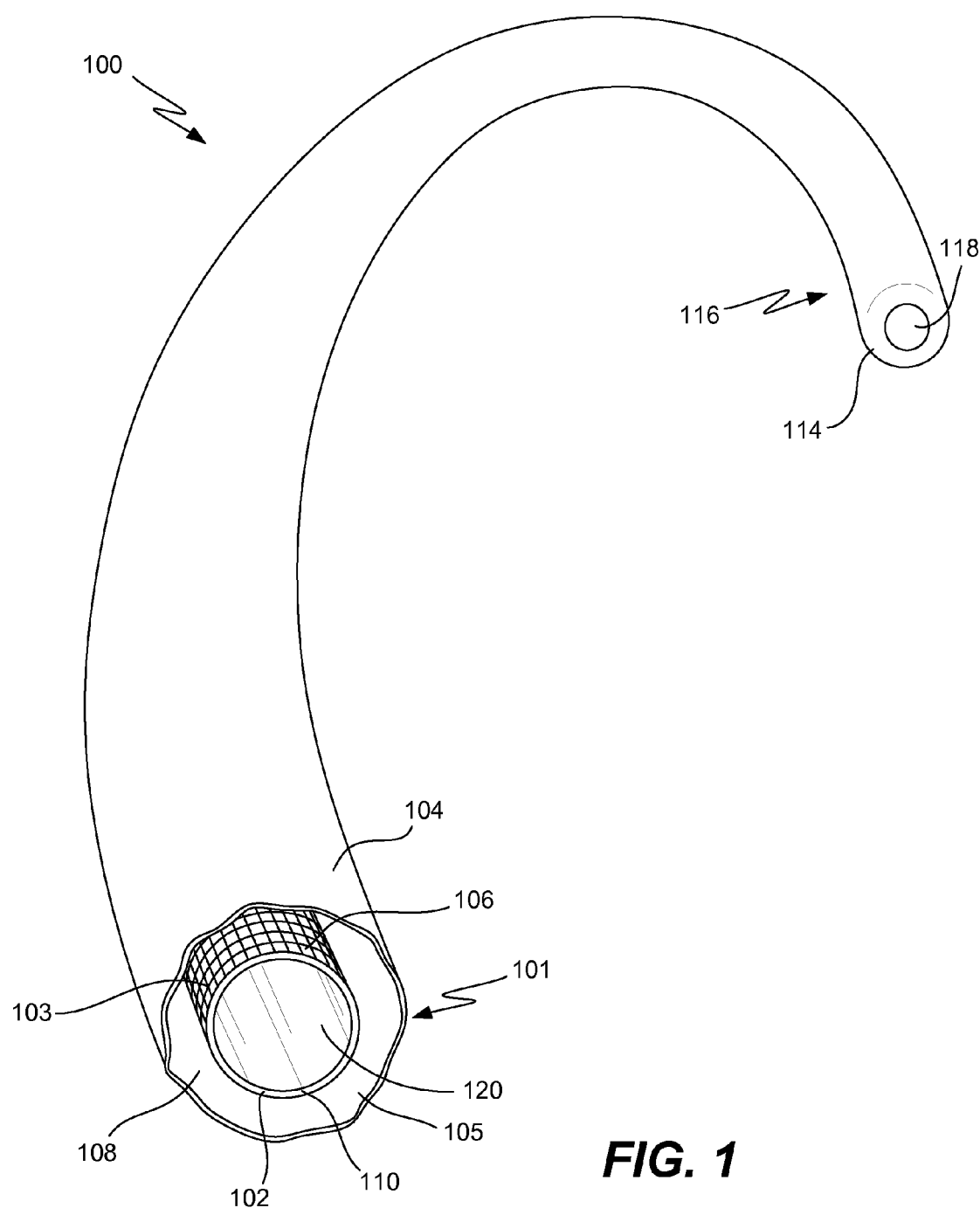
FIG. 1 illustrates a perspective view of a portion of an example articulatable device in accordance with an embodiment of the present invention.

Referring initially to FIG. 1, an example articulatable device 100 (hereinafter also referred to as "articulatable tool") will be described. Articulatable device 100 generally resembles a snake-like or tentacle-like arm and may be configured to use tools and/or other instruments. In another embodiment, articulatable device 100 is equipped with a camera, video camera, thermal imaging system, scope, and/or various sensors (e.g., gas, pressure, temperature) among other devices. In some embodiments, articulatable device 100 may be configured as a guide, sleeve or outer skin for use with other tools and various other devices. By way of example, a tool or other device may be inserted within the central lumen 120 of articulatable device 100 such that device 100 surrounds the respective device and can be used selectively rigidize portions of the device. In some of these embodiments, articulatable device 100 may serve as a guide to steer and navigate the respective device. The length, width (diameter) and cross-section of articulatable device 100 may vary widely according to the needs of a particular application. By way of example, lengths on the order of centimeters to meters are suitable in many embodiments.

As shown by cross-section 101 illustrated in FIG. 1, articulatable device 100 generally includes an inner tube 102, an outer tube 104 and a number of actuatable elements 106 arranged in an intermediate volume 108 between an outer surface 103 of inner tube 102 and an inner surface 105 of outer tube 104. In various embodiments, actuatable elements 106 take the form of scale-like strips that are arranged such that adjacent strips overlap one another. More specifically, the scale-like strips 106 are arranged such that at least a portion of a given strip overlaps at least a portion of an adjacent strip. In the following description of example embodiments, actuatable elements 106 may generally be referred to as scale-like strips 106. However, this is not intended to specifically limit the geometries of the actuatable elements for all embodiments. Articulatable device 100 may have tens, hundreds or thousands (or more) of individual scale-like strips 106.

Inner tube 102 may be regarded as a deformable structure in that inner tube 102 is flexible in at least a longitudinal direction along the length of the inner tube. More specifically, in various embodiments, inner tube 102 is able to longitudinally contract or elongate but is constrained from expanding radially. Inner tube 102 may be formed from a number of different materials. By way of example, inner tube 102 may be formed from silicone, polyurethane, as well as a variety of other suitable elastic materials. Additionally, in some preferred embodiments, the wall 110 of inner tube 102 may have sufficient axial strength so as to inhibit or prevent buckling of inner tube 102 when inner tube 102 is bent or curved such as during use. Generally, a suitable inner tube wall thickness will depend upon many factors including the material and geometry of the inner tube, including the size of inner lumen 120. Alternatively, inner lumen 120 can be pressurized with a fluid such as air or some other gas or liquid to prevent buckling when subjected to compressive loads. For other embodiments that don't rely on internal pressure to maintain their cross-section, thicker wall thicknesses may be desirable.

In embodiments in which inner tube 102 is formed from a material, such as polyurethane, that is radially expandable, a number of circumferential constraints may be provided at spaced locations along the length of the inner tube 102. The circumferential constraints are arranged to inhibit or prevent radial expansion of the inner tube 102 beyond a desired diameter. The circumferential constraints are generally formed from rings of inelastic material and may be fixed with a suitable adhesive or other means with the outer surface 103 of the inner tube 102 such that the circumferential constraints are maintained at desired positions along the length of the inner tube 102 whether the inner tube is contracted, elongated or in some other equilibrium state. In some embodiments, the actuatable elements or scale-like strips 106 may be arranged over the circumferential constraints.

In the embodiment illustrated in FIG. 1, an outer tube 104 is arranged around inner tube 102 such that inner tube 102 and outer tube 104 may be roughly concentric in certain equilibrium and/or nonequilibrium states. Outer tube 104 is also formed from a material that is preferably able to expand and contract longitudinally along the length of the outer tube. By way of example, a number of elastic materials such as polyurethane may be suitable for use in forming outer tube 104.

In some embodiments, outer tube 104 may also be radially expandable such that the diameter of the outer tube 104 may be varied. By way of example, outer tube 104 may be formed from an elastic material that enables outer tube 104 to radially expand when the pressure within intermediate volume 108 is raised sufficiently relative to the surrounding environment. Outer tube 104 may also be formed from an elastic or other flexible material that enables outer tube 104 to radially contract when the pressure within intermediate volume 108 is suitably reduced thereby enabling the inner surface of the outer tube to contact and compress the scale-like strips 106 Like inner tube 102, the thickness of the wall of the outer tube 104 may vary widely according to the needs of a particular application as well as according to the material and geometry of the outer tube.

Articulatable device 100 includes a tip 114 at a distal end 116 of the device. Tip 114 may be configured into virtually any desired shape. In some embodiments, inner tube 102 and outer tube 104 are connected or coupled with tip 114 and cooperate with tip 114 to hermetically seal intermediate volume 108. In some embodiments, a hermetically sealed intermediate volume 108 may be controllably inflated and deflated with various gases (e.g., air, helium, etc). Additionally, in the illustrated embodiment, tip 114 includes an aperture 118. Aperture 118 is particularly useful in embodiments in which it is desirable to pass tools or instruments through central lumen 120 of articulatable device 100 and into or out of aperture 118.

Figure 2A:
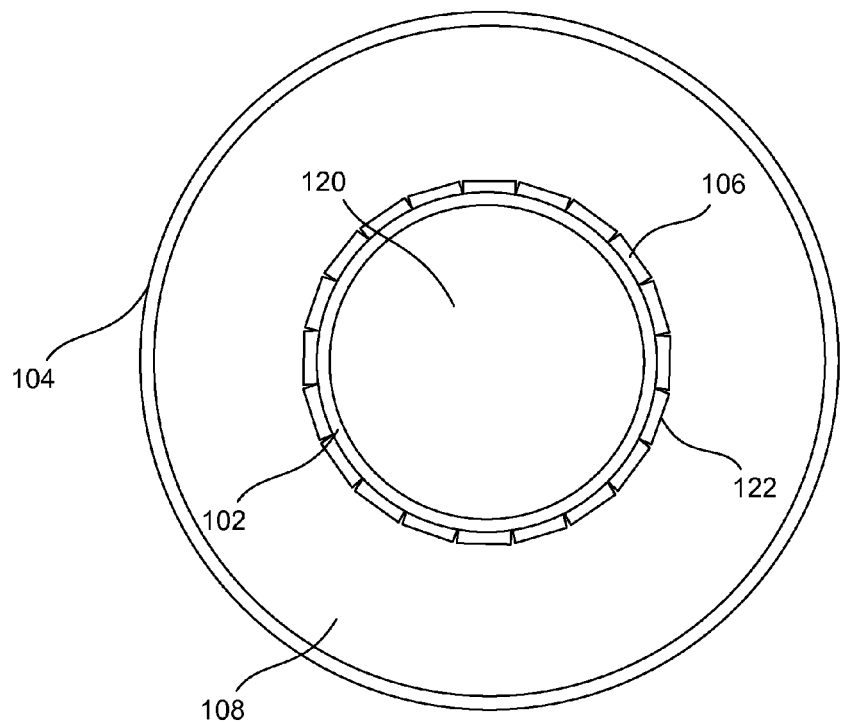
FIGS. 2A and 2B illustrate diametric and axial cross-sectional views, respectively, of a portion of the articulatable device of FIG. 1.
Figure 2B:
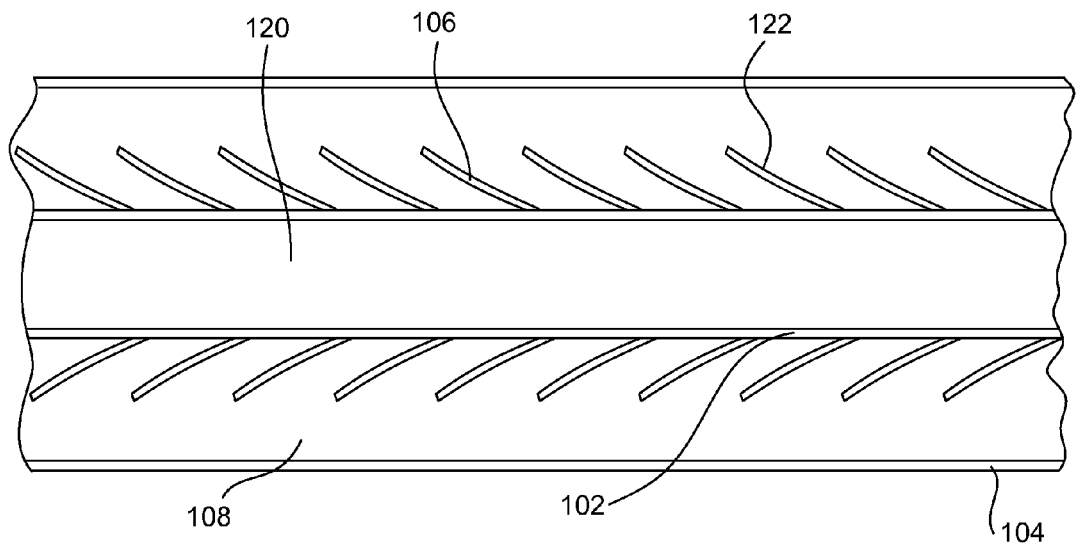

FIGS. 2A and 2B illustrate diametric cross-sectional and axial views, respectively, of a portion of articulatable device 100. FIGS. 2A and 2B show one particular arrangement of scale-like strips 106 in more detail. Unlike inner tube 102 and outer tube 104, scale-like strips 106 are formed from a relatively stiff or inelastic material. By way of example, a number of non-expandable plastic or polymeric materials may be used to form scale-like strips 106. Generally, the scale-like strips 106 are formed so as to be bendable but not extendable; that is, the strips resist tensile strain. In some particular embodiments, scale-like strips 106 are formed from thin strips of Mylar or nylon. Although suitable thicknesses may vary, each scale-like strip 106 may have a thickness in the range of approximately 20 to 60 µm in some particular embodiments. In other embodiments, the strips 106 may be much thicker. Furthermore, in some of the embodiments described below, the strips are formed from a dielectric material. Dielectric scale-like strips 106 are particularly useful in embodiments in which electrostatic forces are used to rigidize the strips 106. In some of these electrostatic embodiments, one outer surface 122 of each scale-like strip 106 is metallized or otherwise coated with a conductive layer. In one particular embodiment, a conductive coating of Aluminum is sputtered, plated or otherwise deposited or attached to outer surfaces 122 of the scale-like strips 106.

In the illustrated embodiment, each scale-like strip 106 is coupled with the outer surface 103 of inner tube 102. By way of example, each scale-like strip 106 may be secured to the outer surface 103 of inner tube 102 with a suitable adhesive. However, in some alternate embodiments, the scale-like strips may be coupled with the inner surface 105 of outer tube 104. Generally, the composition, shape, arrangement and absolute and relative sizes of the scale-like strips 106 may be extremely widely varied. In one embodiment, the scale-like strips 106 are sized relative to the spacing between the scale-like strips to ensure that there is sufficient surface area overlap between adjacent strips to allow clamping (rigidization), even when the inner tube 102 undergoes maximum strain. Generally, scale-like strips with smaller absolute size allow for more intricate variations in strain, subject to the constraint that the frictional force generated in the overlapping areas must remain sufficiently large to resist the tensile stress resulting from applied loads. In one embodiment, if the scale-like strips are relatively short, the thickness of each scale-like strip may be made relatively thinner to allow for more a more bent or curved shape when clamped or unclamped (non-rigidized). Additionally, although the illustrated embodiments generally show the scale-like strips as being rectangular, this is not a requirement in all embodiments. Copending U.S. patent application Ser. No. 11/078,678 entitled "Mechanical Meta-Materials," which is hereby incorporated by reference herein for all purposes, describes various embodiments of suitable scale-like strips and other actuatable elements as well as a few corresponding methods of use and applications.

In the embodiment illustrated in FIGS. 2A and 2B, the scale-like strips 106 are arranged in rows around the circumference of the inner tube 102 with portions of the strips from a given row overlapping corresponding portions of the strips from the next immediately adjacent row. Additionally, in the illustrated embodiment, each scale-like strip 106 is its own individual (discrete) element; that is, each strip is not integrally formed with the adjacent strips surrounding it. The strips 106 are generally arranged such that they are aligned with the central longitudinal axis of the inner tube 102.

Figure 3A:
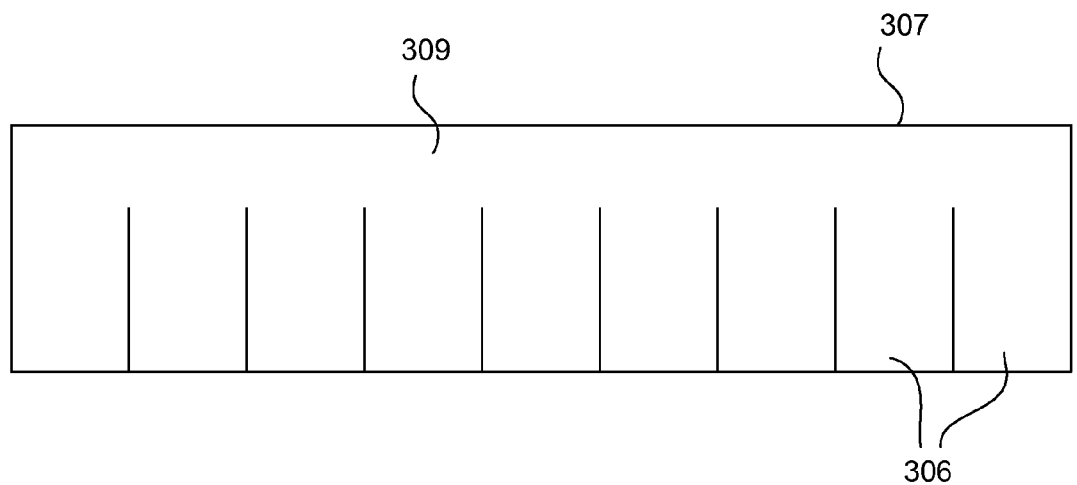
FIG. 3A illustrates a number of integrally formed scale-like strips in accordance with an embodiment of the present invention.
Figure 3B:
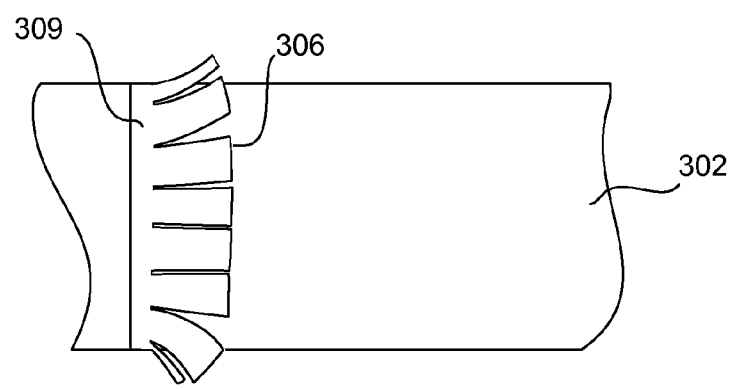
FIG. 3B illustrates the scale-like strips of FIG. 3A wrapped circumferentially around an inner tube in accordance with an embodiment of the present invention.
Figure 3C:
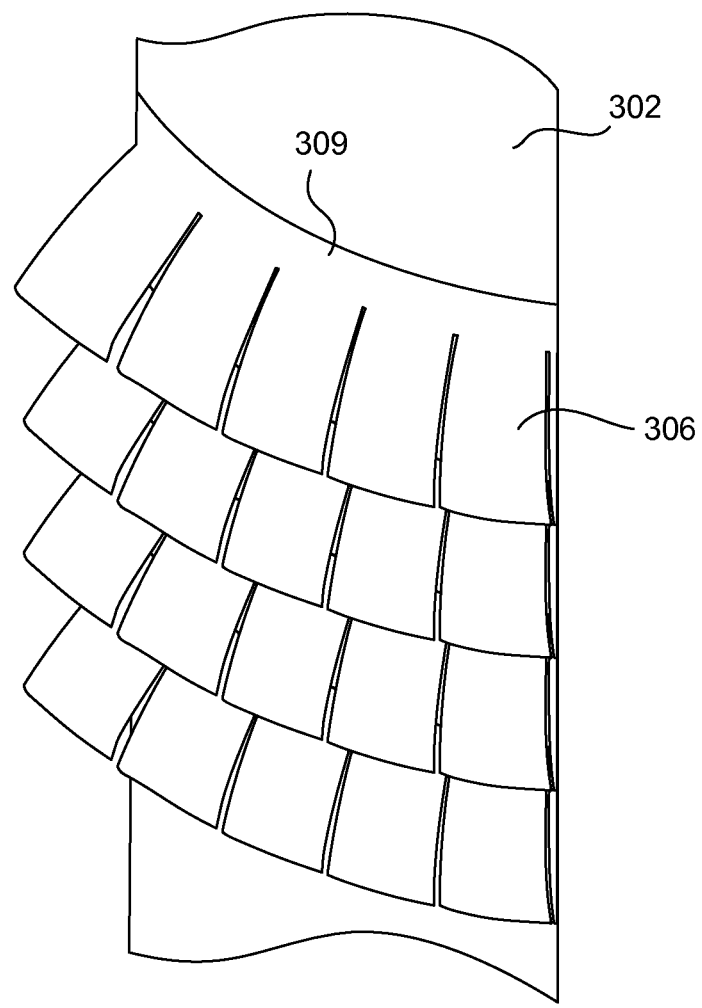
FIG. 3C illustrates the scale-like strips of FIG. 3A wrapped helically around an inner tube in accordance with an embodiment of the present invention.

In another particular embodiment illustrated in FIGS. 3A and 3B, a number of scale-like strips 106 are integrally formed from a single larger strip or sheet. By way of example, FIG. 3A illustrates an example rectangular sheet 307. Sheet 307 has been cut so as to form a multiplicity of scale-like strips 306. Of particular note, each cut does not proceed entirely across the width of the sheet 307 such that each strip 306 remains coupled with the strips 306 adjacent to it via the uncut "root" portion 309. The widths of the strips 306 may vary according to the specific application, but in some specific embodiments, each cut is approximately in the range of 3 to 12 mm (roughly 0.125 to 0.5 in) from each immediately adjacent cut. In larger embodiments, the widths of the strips may be on the order of a centimeter or tens of centimeters (or larger). The number of strips 306 integrally formed from each sheet 307 may also vary widely. In one embodiment, the length of each sheet 307 is suitably sized such that it corresponds to the circumference of the inner tube 302. In this embodiment, the uncut root portion 309 of each sheet 307 is wrapped around and adhesively secured to the circumference of the inner tube 102 so as to form a ring of integrally connected strips 306 as shown in the axial view illustrated in FIG. 3B. In embodiments in which the inner tube is radially expandable, the sheets 307 of scale-like strips 306 may, themselves, serve as circumferential constraints. In another embodiment, longer sheets 307 are used. By way of example, in the axial view illustrated in FIG. 3C, a single sheet 307 is helically wound around the inner tube 302.

Figure 4A:
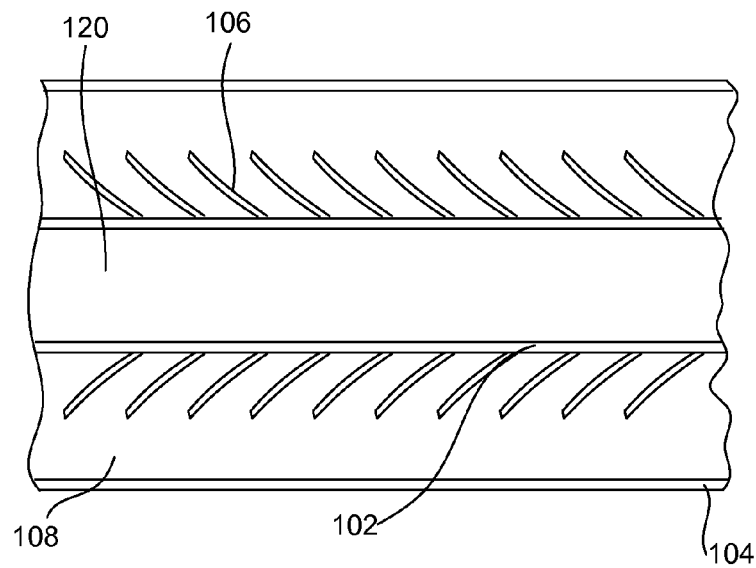
FIG. 4A illustrates a portion of the articulatable device of FIG. 1 in a non-activated contracted state in accordance with an embodiment of the present invention.
Figure 4B:
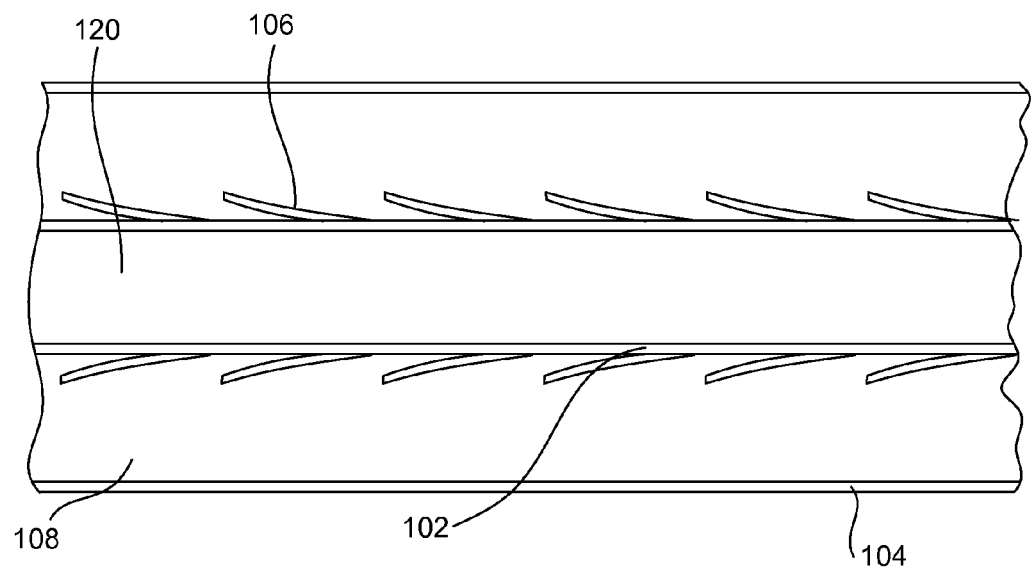
FIG. 4B illustrates a portion of the articulatable device of FIG. 1 in a non-activated elongated state in accordance with an embodiment of the present invention.

In a non-activated (hereinafter also referred to as "non-actuated" or "non-rigidized") state, the friction between adjacent scale-like strips 106 is relatively negligible thereby allowing adjacent strips to slide over one another with negligible force as shown in FIGS. 4A and 4B, which illustrate a portion of device 100 in contracted and elongated states, respectively. By way of example, in some embodiments the device is longitudinally collapsible to within a range of approximately 10 to 25% of its maximum length. In the non-activated state, inner tube 102 is able to contract and elongate according to the stiffness or elasticity of the inner tube 102. Extrapolating, the stiffness or elasticity of the device 100 in the non-activated state is some combination of the stiffnesses of the inner and outer tubes 102 and 104, respectively, and is not significantly affected by the frictional forces between the scale-like strips 106.

Figure 5A:
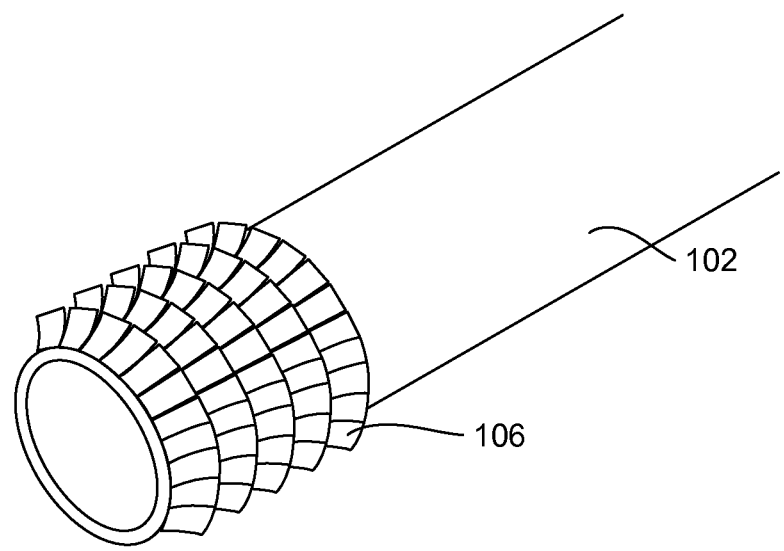
FIG. 5A illustrates a portion of the inner tube of the articulatable device of FIG. 1 having scale-like strips in a non-rigidized state in accordance with an embodiment of the present invention.
Figure 5B:
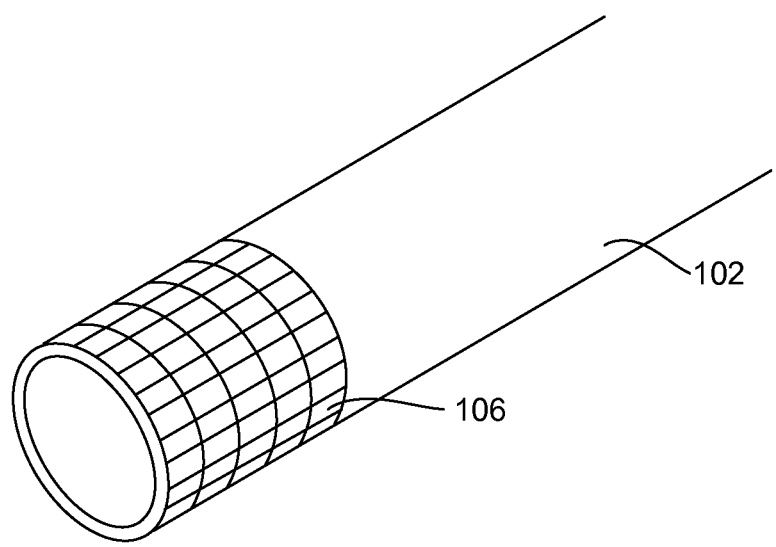
FIG. 5B illustrates the scale-like strips of FIG. 5A in a rigidized state in accordance with an embodiment of the present invention.

However, according to embodiments of the present invention, the frictional forces between adjacent scale-like strips 106 may be selectively varied. Generally, the frictional forces between adjacent scale-like strips 106 are selectively and controllably varied by compressing or clamping adjacent overlapping scale-like strips 106. A few example embodiments for selectively and controllably varying the frictional forces between adjacent scale-like strips 106 will now be described. FIGS. 5A and 5B illustrate perspective views of a portion of inner tube 102 having scale-like strips 106 in non-rigidized and rigidized states, respectively (although only a portion inner tube 102 is shown as having scale-like strips 106, it should be understood that the entire length of inner tube 102 may have the scale-like strips arranged on it).

Figure 4C:
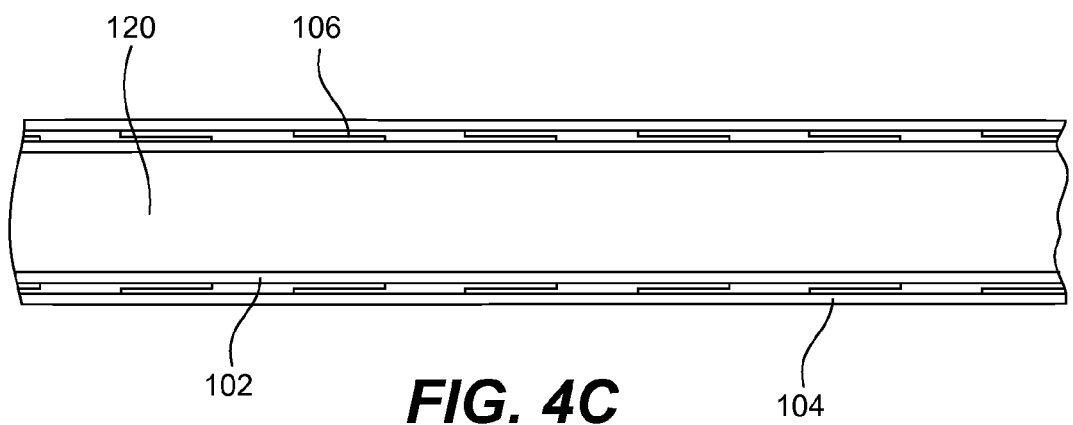
FIG. 4C illustrates a portion of the articulatable device of FIG. 1 in a rigidized elongated state in accordance with an embodiment of the present invention.

In some embodiments, a pneumatic system is utilized to vary the friction between selected scale-like strips 106. More particularly, in one embodiment, a vacuum source is used to draw vacuum to reduce the pressure (e.g. air pressure) within intermediate volume 108 below that of the surrounding environment. The reduction in pressure within intermediate volume 108 has the effect of radially contracting outer tube 104. When the pressure is sufficiently reduced, the inner surface 105 of outer tube 104 contacts and exerts a radial force inward on various outer surfaces 122 of scale-like strips 106. FIG. 4C illustrates the articulatable device 100 of FIGS. 4A and 4B in such a reduced-pressure clamped or activated state. As a result of the contraction of outer tube 104, the normal force, and hence the frictional force, between overlapping surfaces of various scale-like strips 106 is increased. Below a suitable pressure, the increased frictional force between overlapping scale-like strips 106 inhibits relative movement between them.

As a result of the increased friction, the inelastic overlapping scale-like strips 106 are rigidized, or more specifically, the overlapping scale-like strips 106 effectively combine to form an inelastic unitary structure that assumes the stiffness of the inelastic material used to form the scale-like strips 106 themselves. Since relative movement (e.g., sliding) between the overlapping scale-like strips 106 is prevented (as long as an applied load isn't too high), the unitary structure formed by the overlapping scale-like strips is substantially prevented from significant further elongating, contracting or otherwise distorting relative to the arrangement or shape of the scale-like strips 106 prior to rigidization.

Since the overlapping scale-like strips 106 are fixed with the inner tube 102, the flexible inner tube 102 is also effectively rigidized. In the illustrated embodiment, such a reduction of pressure in the entire intermediate volume 108 would have the effect of rigidizing the entire articulatable device 100. Moreover, articulatable device 100 may be rigidized in virtually any shape or configuration. More specifically, articulatable device 100 may be bent at one or more regions along the length of the device and subsequently rigidized such that device 100 maintains the bent form the device was in prior to rigidization. Such a rigidizing ability is useful in a wide assortment of applications. By way of example, articulatable device 100 can be rigidized such that tools or other instruments can be guided and passed through device 100.

Figure 6A:
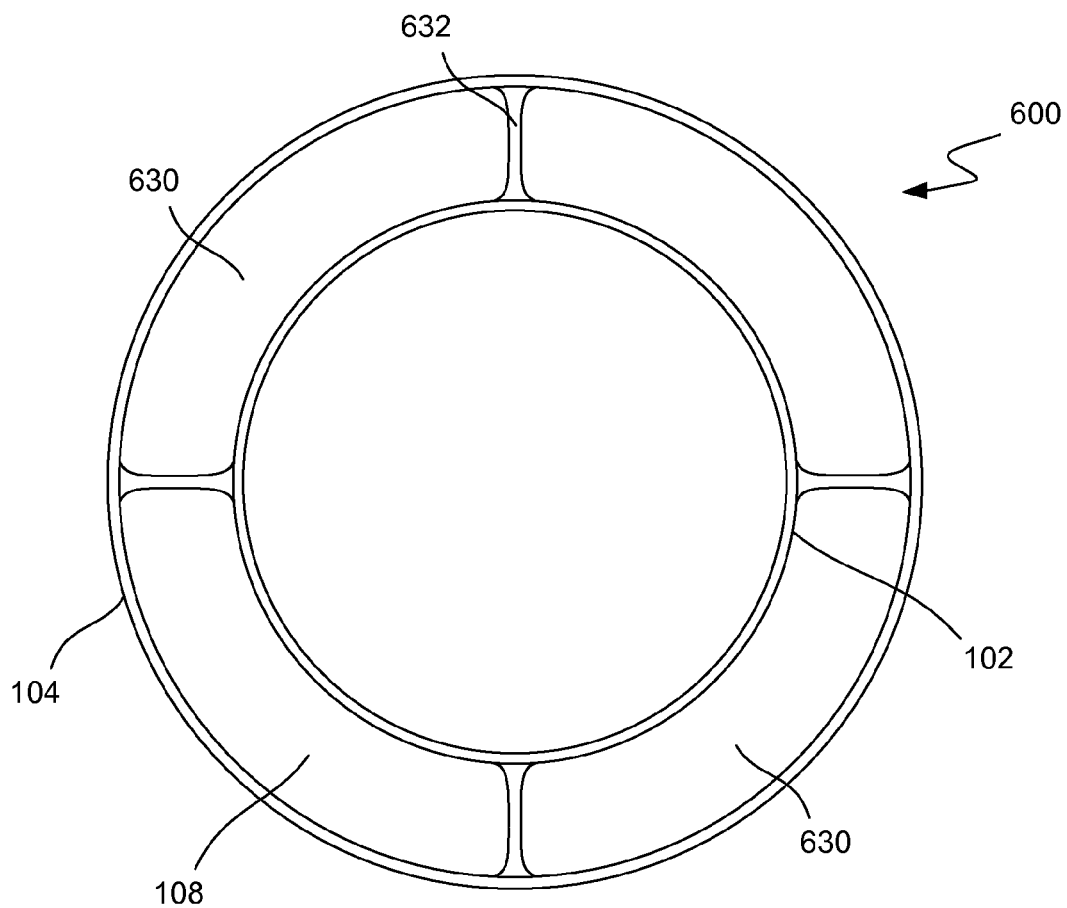
FIG. 6A illustrates a diagrammatic cross-section of an example articulatable device having a number of independently controllable circumferential subvolumes in accordance with an embodiment of the present invention.
Figure 6B:
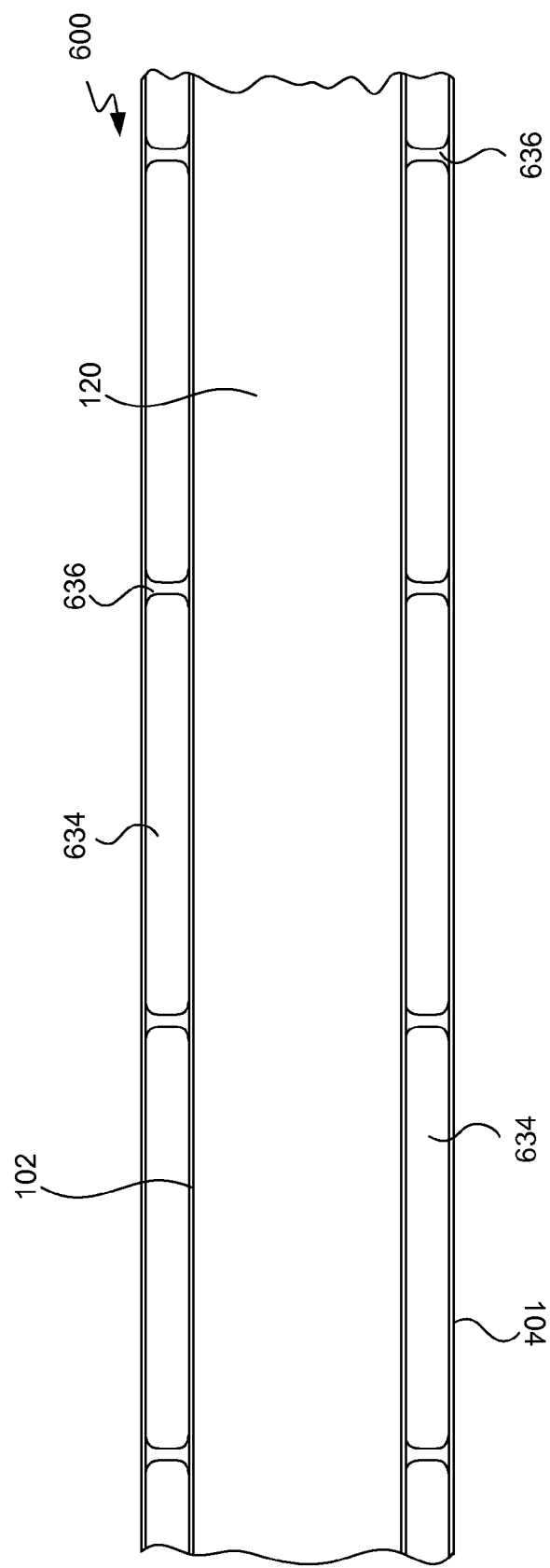
FIG. 6B illustrates an axial cross-section of an example articulatable device having a number of independently controllable longitudinal subvolumes in accordance with an embodiment of the present invention.

In various embodiments, it is desirable to selectively rigidize or clamp only smaller selected specific portions or regions of articulatable device 100. To facilitate this, intermediate volume 108 may be divided or portioned into a number of subvolumes. By way of example, FIGS. 6A and 6B illustrate diametric and axial cross-sections, respectively, of example articulatable devices 600 that utilize pneumatic (e.g., vacuum) systems to rigidize selected regions adjacent independently controllable subvolumes. In the embodiment illustrated in FIG. 6A, intermediate volume 108 is divided into four independently controllable circumferential subvolumes, sections or channels 630. Such channels 630 may be formed, by way of example, by connecting longitudinal segments of the outer surface 103 of inner tube 102 with the inner surface 105 of outer tube 104. In the illustrated embodiment, channel walls 632 interconnect the inner and outer tubes 102 and 104, respectively. In an alternate embodiment, portions of the inner tube 102 itself may be adhesively secured or welded to the outer tube 104 to form the channels 630. Although only four channels 630 are shown in FIG. 6A, it should be noted that the number of channels 630 may vary according to the needs of a particular application. Generally, in such embodiments that utilize vacuum to rigidize the scale-like strips, the number of channels 630 at a given cross-section dictates the number of degrees of freedom, or more particularly, the number of distinct directions of bending the device is capable of at that cross-section. By way of example, each distinct axis the device is able to bend around provides two degrees of freedom. Each channel 630 may be connected with its own associated vacuum line. In this way, the pressure in only one or more selected channels 630 may be reduced so as to rigidize the scale-like strips 106 in only the selected channel(s), and thereby only the portion of the inner tube 102 adjacent the selected channel(s). It should be noted that rigidizing scale-like strips 106 in two or more channels 634 at a given diametric cross-section can provide additional axes of rotation and hence, more degrees of freedom.

Intermediate volume 108 may also be divided into subvolumes along the length of the device as illustrated by the longitudinal cross-section of FIG. 6B. In the illustrated embodiment, the intermediate volume 108 is longitudinally divided into four longitudinal sections 634 by section walls 636. Although only four longitudinal sections 634 are shown, it should be noted that the number of longitudinal sections 634 may be widely varied based on the needs of a particular application. Generally, in such embodiments that utilize vacuum to rigidize the scale-like strips, the number of longitudinal sections 634 dictates the number of separately rigidizable longitudinal portions of articulatable device 600. More particularly, since each section 634 may be rigidized independently of the other sections, a portion of the device that has already being navigated through a turn may be rigidized while other portions of the device remain flexible. Moreover, in some embodiments it may be desirable to incorporate a number of independently controllable circumferential sections (such as channels 630 described with reference to FIG. 6A) within each longitudinal section 634, thereby enabling even more selective control over which portions of the device are rigidized.

In various alternate embodiments, the scale-like strips 106 of articulatable device 100 may be clamped and rigidized via other means. In one alternate embodiment, electrostatic forces are utilized to clamp or rigidize selected scale-like strips 106. In these embodiments, the scale-like strips 106 are formed from a dielectric material. In some particular embodiments, one outer surface 122 of each scale-like strip 106 is metallized or coated with some other conductive layer. By way of example, outer surfaces of Mylar or nylon strips may be metallized with a thin film of aluminum.

In an example electrostatic embodiment, an electrostatic potential is applied to selected strips and/or to associated electrodes on the inner and/or outer tubes 102 and 104. When a sufficient electrostatic potential is applied, an electric field is created between adjacent overlapping scale-like strips that forces the strips together thereby increasing the frictional force between them and eventually rigidizing adjacent overlapping scale-like strips.

Figure 7A:
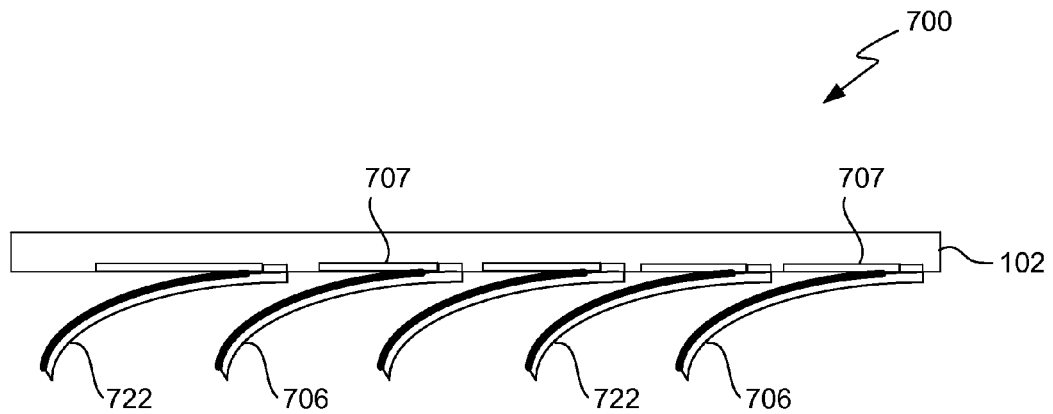
FIG. 7A illustrates an axial cross-section of a portion of an example articulatable device that utilizes electrostatic clamping in a non-activated state in accordance with an embodiment of the present invention.
Figure 7B:
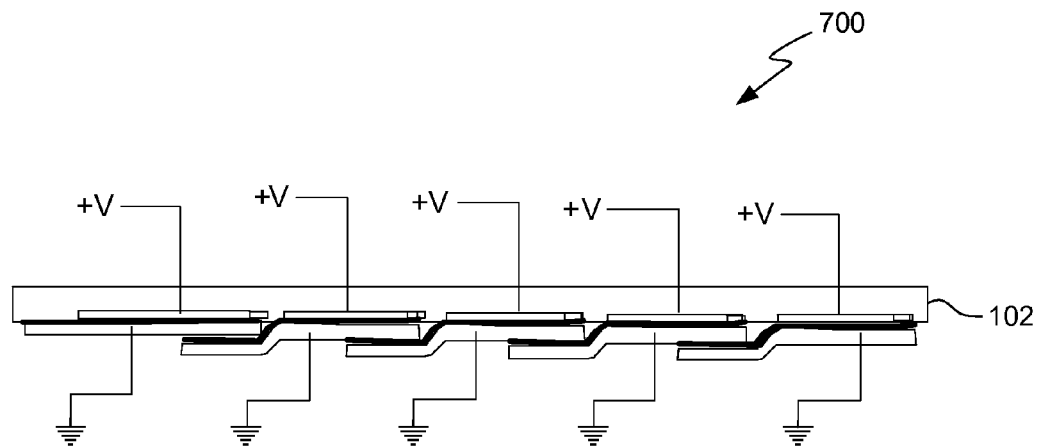
FIG. 7B illustrates the device of FIG. 6A in an electrically activated clamped rigid state.

FIG. 7A illustrates a portion of an axial cross-section of an articulatable device 700 having electrically actuatable scale-like strips 706. In the illustrated embodiment, each electrically actuatable scale-like strip 706 has an associated electrode 707 attached to the wall of the inner tube 102 adjacent the particular scale-like strip. FIG. 7B illustrates the device of FIG. 7A while in a clamped or rigidized state. In the embodiment illustrated in FIG. 7B, outer conductive surfaces 722 of selected scale-like strips 706 are grounded while associated electrodes 707 adjacent the selected scale-like strips are biased to a positive voltage +V. By way of example, a positive voltage in the range of 500 to 5000 Volts has been shown to work well in some embodiments.

In an alternate embodiment, electrodes 707 are not required. In this embodiment, the outer surfaces of adjacent overlapping scale-like strips 706 are biased to different voltages. By way of example, the outer conductive surfaces of a first row of strips 706 may be biased to a voltage V+ while the outer conductive surfaces of an immediately adjacent second row of strips 706 may be grounded or biased to a negative voltage V− thereby clamping the adjacent overlapping strips. This pattern may be repeated such that a third row of strips 706 immediately adjacent the second row is again biased to +V.

In still another embodiment, addressable electrodes 707 are also positioned on the outer tube 704. In this embodiment, the scale-like strips 706 may be entirely formed from a dielectric material and do not include conductive surfaces. Rather, when selected scale-like strips 706 are to be clamped, opposing voltages may be applied to the electrodes 707 on the inner and outer tubes 702 and 704, respectively. By way of example, selected electrodes 707 on the inner tube 702 may be biased to a positive voltage V+ while diametrically adjacent associated electrodes 707 on the outer tube 704 are grounded or biased to a negative voltage V− thereby generating an electric field across the associated scale-like strips 706 in between the biased electrodes 707.

More details of electrostatic clamping mechanisms can be found in copending U.S. patent application Ser. No. 11/078,678 entitled "Mechanical Meta-Materials," which is incorporated by reference herein for all purposes.

In various embodiments, both the scale-like strips 706 themselves as well as any associated electrodes are individually addressable thereby permitting selective rigidization control at the granularity of the scale-like strips 706 themselves. In other embodiments, it may be sufficient to address a plurality of scale-like strips 706 and/or the associated electrodes 707 at a group level thereby rigidizing a group of the strips simultaneously. In some embodiments individual wires may be used to electrically connect the scale-like strips 706 with a controller coupled with the device. Such wires may be routed through intermediate volume 708 and/or the central lumen 720. Alternately, the scale-like strips 706 and electrodes 707 may be electrically connected with the controller via electric traces that may be printed or otherwise deposited onto the outer surface 703 of inner tube 702 itself. Additionally, the electrodes 707 themselves may also be printed onto the associated surface of the inner 702 or outer tube 704. By way of example, such electric traces may be formed of graphite deposited onto the respective surface.

In still other embodiments, other means of altering the frictional forces between overlapping scale-like strips 106 may be used. By way of example, in some embodiments, magnetic clamping may be used to rigidize the scale-like strips 106. Additionally, it will be appreciated that any of the described means of altering the frictional forces between overlapping scale-like strips 106 are tunable; that is, the frictional forces, and hence the degree of rigidization, may be finely controlled. Generally, the precision of tunable control will depend on the number of scale-like strips 106 and the granularity of addressing used to activate or rigidize the scale-like strips.

While the foregoing embodiments were described with reference to specific arrangements of scale-like strips 106, it should be noted that selective rigidization may be practiced with a wide assortment of arrangements of scale-like strips having varying sizes and shapes. By way of example, thus far the embodiments have shown overlap of scale-like strips in a regular pattern in a single direction. That is, the actuatable elements, strips or scales 106 have generally been arranged in rows. Such arrangements are well suited for materials where the external loads are applied in one direction (such as axial loads). However, the arrangement of the scale-like strips is not limited to such a simple arrangement and other arrangements are contemplated. By way of example, the scale-like strips may be arranged such that there is overlap between adjacent strips in all or a number of different directions. Such an arrangement of scale-like strips allows the articulatable device to respond as desired to loads in a multitude of directions as well as to bending moments applied to the device.

Additionally, as described above, the width and orientation of the strips 106 may also be widely varied. In one embodiment, the scale-like strips are implemented with an aspect ratio (length vs. width) that is relatively low. By way of example, an aspect ratio between about 1 and about 5 is suitable in many embodiments. To maintain multi-dimensional control of the stiffness, the scale-like strips may overlap in both longitudinal and circumferential directions. Other aspect ratios may also be employed. In another embodiment, narrow scale-like strips (a high aspect ratio) are utilized.

Furthermore, while the aforementioned embodiments were described as including both an inner and an outer tube, this is not a requirement in all embodiments. By way of example, in some embodiments an outer tube is not included. In embodiments in which electrostatic forces are used to rigidize the scale-like strips, the outer surface of the strips may be insulating so as to not create an electrical pathway to the surrounding environment. In other embodiments, an inner tube is not included. In these embodiments, the scale-like strips are coupled with the inner surface of the tube.

In still other alternate embodiments, the outer tube 104 and/or inner tube 102 may not take the form of solid-walled tubes but, rather, perforated tubular or cylindrical structures. By way of example, the walls of one or both of the tubes may resemble a braided, woven or "fish net" design. It should also be recognized that the cross-sections of the inner and outer tubes need not be circular in all embodiments. By way of example, oval or elliptical cross-sections may be suitable in some particular applications. Additionally, the inner and outer tubes need not be closed form in all embodiments; that is, a diametric cross-section of the tube wall may form a "c" shape, "u" shape or other desired shape in other embodiments.

Figure 8:
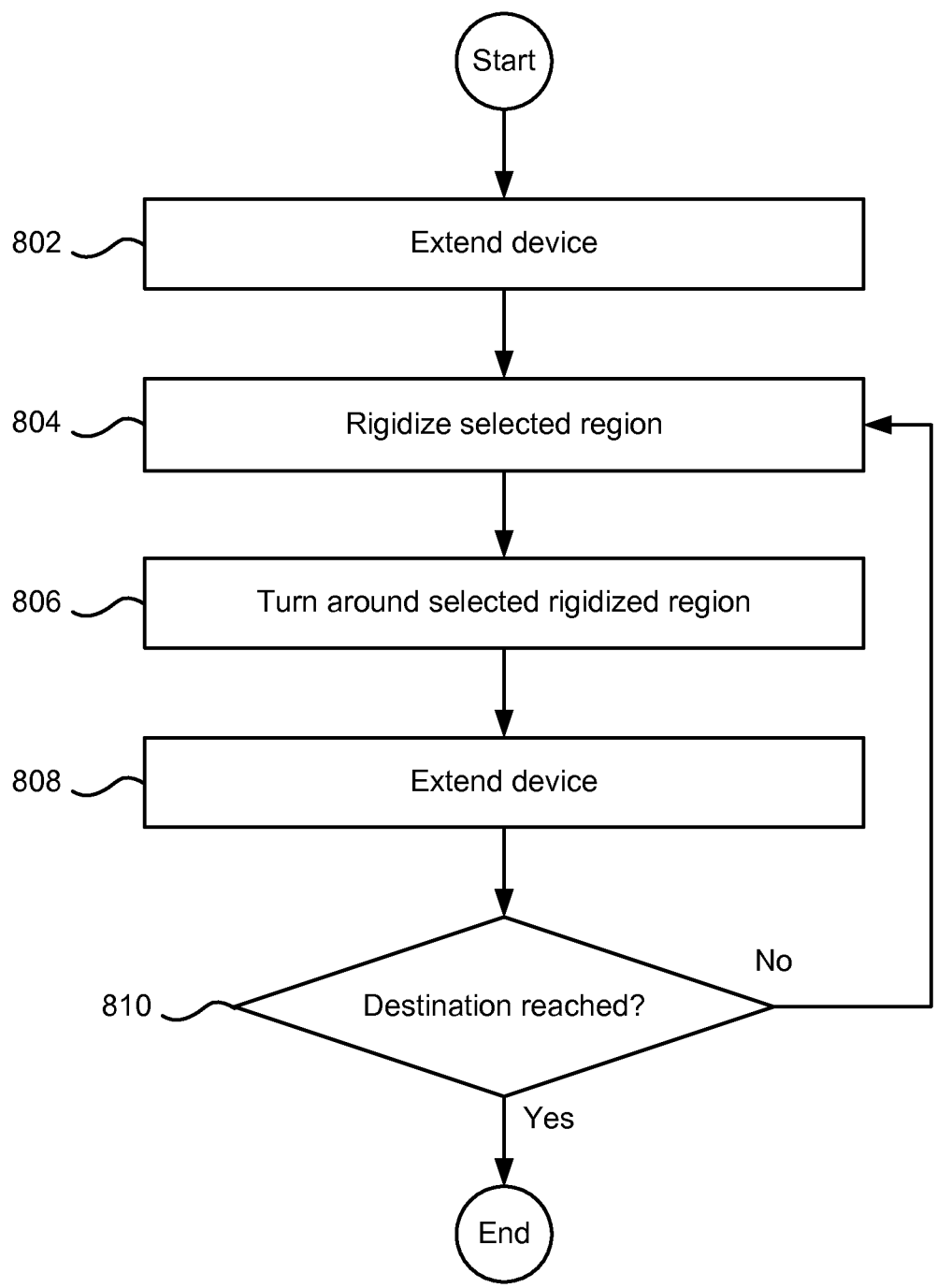
FIG. 8 shows a flowchart illustrating a process for actively steering and advancing an articulatable device in accordance with an embodiment of the present invention.

Various applications and methods of use of an articulatable device such as any of those described above will now be described. In one aspect, selective rigidization is utilized to steer an articulatable device. By way of example, FIG. 8 shows a flowchart illustrating one example process for actively steering an articulatable device. In one embodiment, an articulatable device 900 having scale-like strips (not shown) such as any of those described above is provided in a contracted state. In one particular embodiment, the scale-like strips and associated tube(s) are telescopically contracted such that some of the strips and portions of the tube are contracted within each other similar to an extendable telescope.

Figure 9A:
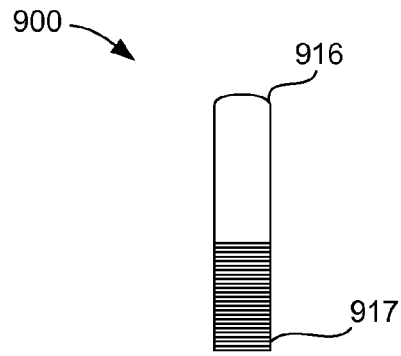
FIGS. 9A-9C illustrate various steps in the process of FIG. 8.

At 802, the distal end 916 of the articulatable device is extended from the remaining contracted portion as illustrated in FIG. 9A. In a particular embodiment, the distal end of the articulatable device is arranged to extend telescopically from the remaining contracted portion of the device 900. However, in some alternate embodiments, the proximal end 917 of the articulatable device 900 is the first to elongate. In these embodiments, the contracted portion is advanced and the distal end 916 of the device may be the last portion to elongate.

The articulatable device may be extended with any suitable means. By way of example, in various embodiments the pressure within the inner central lumen of the device can be increased so as to elongate a desired portion of the device. In various embodiments, a specific selected region or portion of the device can be elongated by increasing the central lumen pressure and rigidizing the scale-like strips not associated with the specific portion such that the selected portion is free to longitudinally expand while other portions of the device remain rigid and unable to elongate.

Figure 9B:
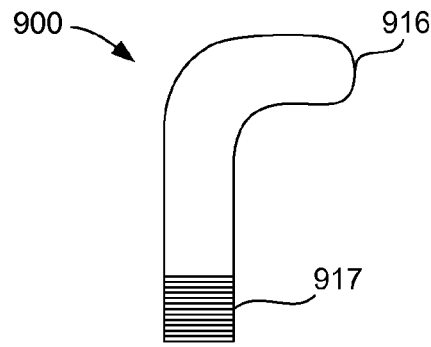

At 804, a selected region 950 of the extended portion of the device is rigidized to facilitate steering of the device. More particularly, the articulatable device may be rigidized at a specific region along the length of the device and along a specific portion of the circumference of the device. The specific rigidized region 950 may be rigidized with any suitable means such as any of those described above. At 806, the device is bent around the rigidized region thereby turning or steering the device around the rigidized region as illustrated in FIG. 9B. In one specific embodiment, the device is steered around the rigidized portions by increasing the pressure within the central lumen. Increasing the pressure within the central lumen has the effect of expanding non-rigidized regions of the inner tube including the non-rigidized region diametrically opposite the selected rigidized region. As the rigidized region is longitudinally constrained and the non-rigidized region is permitted to expand under the force generated by the pressure within the central lumen, the device is actively steered around the rigidized region. In the way, rigidization itself is used in conjunction with elongation to steer the device.

In an alternate embodiment, the distal end 916 of the articulatable device 900 may be steered via other means. By way of example, the distal end 916 of the articulatable device 900 may be equipped with steering cables (hereinafter also "wires," "steering wires," or "tensile wires"). The steering cables may run the length of the device, attached at the distal tip 916, and operated at the proximal end using associated actuators or manual means. In embodiments in which actuators are utilized, each cable may be coupled with an associated actuator configured to shorten or lengthen the cable. Steering cables and actuators are well known in the art and as such will not be described in detail here. The articulatable device may be bent at any point along its length by making rigid all but the region around which it is desired to bend the device, and then pulling on the cable or cables corresponding to the direction and magnitude of the desired bend. In various embodiments, articulatable device 900 may be equipped with three such steering cables all coupled with the distal end 916 of the device. The use of three such cables enables three-dimensional steering of the distal end 916. However, while three cables are used in a preferred embodiment, in other embodiments the articulatable device may be equipped with two, four or even more cables thereby enabling finer control over the steering of the distal end 916.

The device 900 may then be further extended or advanced at 808 to reach a desired destination. In a particularly useful embodiment, the scale-like strips are either individually addressable and actuatable or at least addressable or actuatable in sufficiently small groups to enable a user (or a computer or circuit controlled by the user) to have fine control over where and when specific selected regions of the device are rigidized. In one embodiment, after a turn is made, the device is further advanced using a locomotion scheme that may resemble a rectilinear locomotion scheme used by some snake species. More particularly, while the proximal end of the articulatable device is pushed (or while the device is elongated telescopically) the scale-like strips at the selected rigidized region of the device at the turn are unclamped or unrigidized such that they may be advanced. Concurrently, the proximal scale-like strips 906 immediately adjacent the formerly rigidized strips are then rigidized. In this way the articulatable device may be advanced while the absolute location of the bend or turn in the device remains unchanged.

At 810 it is determined whether or not the destination has been reached. If the destination is reached, the process may end here. However, once at a desired destination, the entire rigidizable length of the articulatable device or portions thereof may be rigidized using any of the methods described herein. Rigidizing the articulatable device allows the device to serve as a rigid platform or guide for passing tools, instruments and other things through the central lumen of the device and in some embodiments out of the distal end of the device. Additionally, in some embodiments an intermediate volume between the inner tube and outer tube is pressurized to expand the outer tube. By way of example, it may be desirable to expand the entire outer tube or portions thereof to increase the rigidity of the device and reduce the propensity for buckling, or such that the outer surface of the device contacts the walls of, for example, a surrounding enclosure such as a tube or pipe. This can serve to anchor the device within the surrounding enclosure.

Figure 9C:
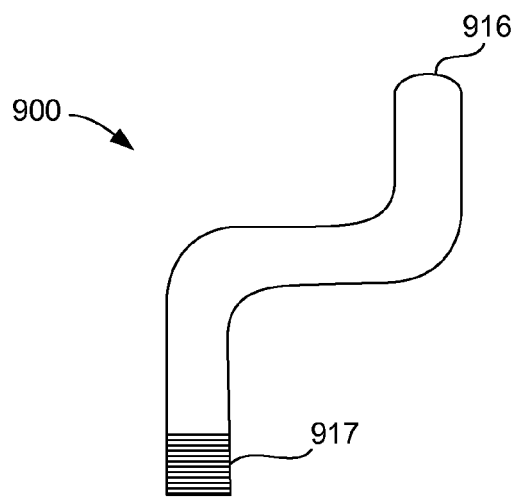

If, however, the target destination has not been reached because, for example, more turns are required, then the process returns to 804. Recalling that the articulatable device can be advanced while the absolute location of a bend or turn remains fixed, the distal end of the device can be actively turned numerous times while locomotion is used to advance the device such that bends that have already been made remain in the corresponding original absolute locations. Moreover, it should be noted that the steering cables coupled with the distal end of the device can control the movement/steering of multiple articulations by rigidizing all but the articulation that is being moved. With such a scheme only one articulation may be moved at a time, but numerous articulations can be controlled with just the common set of cables coupled with the distal end of the articulatable device. In one example embodiment, a computer controller is used to sequentially actuate (e.g., via electrostatic or other suitable means) the scale-like strips through each articulation in small discrete steps. Furthermore, by increasing the rate of the sequential actuations and by reducing the size of the scale-like strips, the discrete steps become smoother and the advancement of the articulatable device more closely resembles snake-like motion. Preferably, the rate of advancement of the device is carefully controlled (e.g., by the user or with computer controlled mechanisms) such that the timing of the sequence of actuations coincides with the rate of advancement of the device. In this way, the articulatable device can advance smoothly using movements that would conventionally require simultaenous movement of the articulations with independent actuators. This enables a user to actively steer the distal end of the articulatable device all of the way to the target destination. FIG. 9C illustrates articulatable device 900 after a second turn. During the second turn, all but the portion of the device 900 at the second turn may be rigidized.

Additionally, it should be noted that in embodiments in which steering cables are used to steer or guide the device, only three total cables are required for three-dimensional motion and for virtually any number of articulations or turns along the length of the articulatable device. More specifically, by pulling on one of the cables a torque is exerted on the body of the device, which results in bending at the articulations which are not clamped or rigidized. With this technique the device can be bent into complex shapes using a limited number of actuators. In contrast, those of skill in the art will appreciate that, generally, conventional articulatable devices require cables or other actuators on each segment or joint to permit multiple articulations. As such, the number of cables and/or actuators required dramatically increases with the degrees of freedom desired for conventional devices. However, the ability to selectively rigidize specific small regions of the articulatable device according to embodiments of the present invention permits multiple articulations in three dimensions along the length of the device with only three cables (or two cables for multiple articulations in two dimensions).

The described articulatable devices may find use in numerous applications. By way of example, the described articulatable devices are particularly suitable for use in various surveillance, inspection and maintenance applications. By way of example, in various example surveillance applications, the articulatable device may be equipped with a camera, video camera, thermal imaging system or some other imaging system at the distal end of the device. In some embodiments, a user such as a law enforcement officer or military personnel may secretly position the device in proximity to a suspect, foe or other party to be surveyed. The device may then be either manually or electronically (via a computer controller), and even remotely, navigated via the described methods into a window or hole in a wall or ceiling or even through an air duct or pipe into a room where the surveyed party is located. The articulatable device may also be equipped with audio recording equipment and/or even a weapon. In some embodiments, a gas such as tear gas may be passed through the central lumen and released out of the aperture at the distal end of the device and into the room. In still other embodiments, the device may also be equipped with tools such as wire cutters and pliers for use in disarming a bomb.

In other embodiments, an articulatable device may be utilized for inspection or maintenance purposes. By way of example, the device may be equipped with a light and/or various tools to inspect a mechanical or electrical system, diagnose a problem and/or fix or repair the problem with the tools under guidance by a user who may be viewing remotely via a video camera at the distal end of the device. The device is especially suited for use in inspected pipes and other tubular structures. The device may also be used in exploratory purposes such as in cave systems (even underwater) or within wreckage (to search for trapped victims) where it is unsafe for humans to venture. The articulatable device is especially useful in these embodiments as it is lightweight and therefore may be able to extend much longer than conventional devices without buckling or breaking.

In various embodiments, the articulatable devices are reconfigurable; that is, various tools, instruments or other devices may be passed through the central lumen of the device and exchanged with other tools as needed thereby increasing the applicability of the device.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. An articulatable device, comprising:
a flexible inner tube having a first lumen;
a flexible outer tube that receives the inner tube; and
a multiplicity of overlapping, rigidizable scale-like strips each coupled with the inner tube and positioned between the inner and outer tubes, the strips being actuatable between a non-rigidized state in which overlapping strips are slideable relative to one another and a rigidized state in which overlapping strips are not slideable relative to one another;
wherein the device is steerable at a predetermined region along the length of the device by selectively rigidizing a number of the overlapping strips adjacent the predetermined region, and elevating the pressure within the first lumen such that a portion of the inner tube diametrically opposite the rigidized portion expands while the rigidized portion is substantially prevented from expanding, thereby bending the device at the predetermined region.

2. The articulatable device as recited in claim 1, wherein the overlapping scale-like strips are formed from an substantially inelastic material and wherein adjacent overlapping ones of the inelastic scale-like strips are actable between the rigidized state and the non-rigidized state by selectively controlling frictional forces between the adjacent overlapping ones of the inelastic scale-like strips.

3. An articulatable device, comprising:
a flexible inner tube having a first lumen;
a flexible outer tube that receives the inner tube; and
a multiplicity of overlapping, rigidizable scale-like strips each coupled with the inner tube and positioned between the inner and outer tubes, the strips being actuatable between a non-rigidized state in which overlapping strips are slideable relative to one another and a rigidized state in which overlapping strips are not slideable relative to one another, wherein the scale-like strips are arranged in a multiplicity of independently actuatable groups and at least some of the independently actuatable groups of scale-like strips are circumferentially separated such that one side of a section of the inner tube may be selectively rigidized while an opposing side of the inner tube is not rigidized to facilitate bending of the articulatable device.

4. The articulatable device as recited in claim 3, wherein the device is steerable at a predetermined region along the length of the device by:
 selectively rigidizing a number of the overlapping strips adjacent the predetermined region, and
 elevating the pressure within the first lumen such that a portion of the inner tube diametrically opposite the rigidized portion expands while the rigidized portion is substantially prevented from expanding, thereby bending the device at the predetermined region.

5. The articulatable device as recited in claim 3, wherein at least some of independently actuatable groups of scale-like strips are longitudinally separated such that longitudinally distinct sections of the inner tube may be selectively rigidized.

6. The articulatable device as recited in claim 2, wherein the inner tube is radially constrained and wherein the outer tube is radially expandable.

7. The articulatable device as recited in claim 6, further comprising a vacuum source arranged to selectively apply a vacuum to a region between a portion of the inner tube and a corresponding portion of the outer tube to rigidize adjacent overlapping strips, wherein the adjacent overlapping strips are pressed together by the outer tube under the influence of the vacuum thereby substantially increasing the frictional forces between the adjacent overlapping strips.

8. The articulatable device as recited in claim 7, wherein an intermediate volume between the inner and outer tubes is divided into at least two subvolumes and wherein the pressure in each of the subvolumes can be independently controlled.

9. The articulatable device as recited in claim 8, wherein the intermediate volume is divided angularly such that at least two subvolumes extend through at least one diametric cross-section of the device thereby enabling the device to be rigidized at at least two different regions around the circumference of the inner tube.

10. The articulatable device as recited in claim 8, wherein the intermediate volume is divided longitudinally such that at least two subvolumes extend through at least one longitudinal cross-section of the device enabling the device to be rigidized at at least two different regions along the length of the device.

11. The articulatable device as recited in claim 1, further comprising an electrical source, wherein an electrostatic force is used to press adjacent overlapping strips together thereby substantially increasing the frictional forces between the adjacent overlapping strips.

12. The articulatable device as recited in claim 11, wherein each strip comprises a dielectric material having a conductive coating on a first surface thereof, and wherein the electrical source is arranged to selectively apply an electric field across selected ones of the overlapping strips.

13. The articulatable device as recited in claim 11, wherein one or both of the inner and outer tubes include electrodes and wherein the electrical source is arranged to selectively apply an electrostatic potential to selected ones of the electrodes thereby generating an electric field across associated ones of the overlapping strips.

14. An articulatable device, comprising:
 a flexible inner tube having a first lumen;
 a flexible outer tube that receives the inner tube;
 a multiplicity of overlapping, rigidizable scale-like strips each coupled with the inner tube and positioned between the inner and outer tubes, the strips being actuatable between a non-rigidized state in which overlapping strips are slideable relative to one another and a rigidized state in which overlapping strips are not slideable relative to one another, wherein when the pressure within the inner lumen is suitably elevated the pressure results in a force that acts to longitudinally expand the inner tube and thereby the device.

15. The articulatable device as recited in claim 14, wherein the device is steerable at a predetermined region along the length of the device by
 selectively rigidizing a number of the overlapping strips adjacent the predetermined region, and
 elevating the pressure within the first lumen such that a portion of the inner tube diametrically opposite the rigidized portion expands while the rigidized portion is substantially prevented from expanding, thereby bending the device at the predetermined region.

16. The articulatable device as recited in claim 14, wherein the inner tube is elastic, the device further comprising a multiplicity of radial constraints each arranged around a different circumference of the inner tube so as to substantially prevent the inner tube from expanding beyond a predetermined diameter and such that the inner tube is capable of expanding longitudinally.

17. The articulatable device as recited in claim 16, wherein ones of the scale-like strips serve as radial constraints.

18. The articulatable device as recited in claim 1, wherein each of the strips has a thickness in the range of approximately 20-60 μm.

19. The articulatable device as recited in claim 1, wherein the device is longitudinally collapsible to within a range of approximately 10 to 25% of its maximum length.

20. An articulatable device, comprising:
 a flexible inner tube having a first lumen;
 a flexible outer tube that receives the inner tube;
 a multiplicity of overlapping, rigidizable scale-like strips each coupled with the inner tube and positioned between the inner and outer tubes, the strips being actuatable between a non-rigidized state in which overlapping strips are slideable relative to one another and a rigidized state in which overlapping strips are not slideable relative to one another; and
 an actively steerable tip at a distal end of the device.

21. The articulatable device as recited in claim 20, further comprising at least two steering cables coupled with the distal end of the device, the steering cables being coupled with associated actuators, the actuators and cables being used to steer the steerable tip, and wherein the steering cables coupled with the distal end of the device can control the steering of multiple articulations along the device by rigidizing all but the articulation that is being moved at a given time such that numerous articulations can be controlled with just the three steering cables coupled with the distal end of the device.

22. The articulatable device as recited in claim 21, wherein the device includes three steering cables coupled with the distal end of the device thereby enabling three-dimensional steering of the device.

23. The articulatable device as recited in claim 21, wherein after the tip is steered around a bend, the articulated portion of the device is rigidized.

24. The articulatable device as recited in claim 23, wherein the device is coupled with a controller that can sequentially rigidize the scale-like strips along a length of the device such that the device may be advanced with a snake-like locomotion scheme in which the scale-like strips are advanced through the bend in small discrete steps such that the absolute location of the articulation remains fixed while the device is advanced through the bend.

25. A method of steering an articulatable device that includes a flexible inner tube having a first lumen and a multiplicity of overlapping, rigidizable scale-like strips each coupled with the inner tube, the method comprising:
    selectively rigidizing a number of the overlapping strips adjacent a predetermined region, and
    elevating the pressure within the first lumen such that a portion of the inner tube diametrically opposite the rigidized portion expands while the rigidized portion is substantially prevented from expanding, thereby bending the device at the predetermined region.

26. The method as recited in claim 25, further comprising sequentially rigidizing the scale-like strips along a length of the device such that the device may be advanced with a snake-like locomotion scheme in which the scale-like strips are advanced through the bend in the device in small discrete steps such that the absolute location of the bend remains fixed while the device is advanced through the bend.

27. The method of claim 26, wherein the articulatable device further includes a flexible outer tube that receives the inner tube and wherein the scale-like strips are positioned between the inner and outer tubes.

28. The method as recited in claim 27, wherein each strip comprises a dielectric material having a conductive coating on a first surface thereof, and wherein an electrical source is arranged to apply an electrostatic potential to the selected ones of the overlapping strips thereby generating an electric field across associated ones of the overlapping strips, the electric field resulting in an electrostatic attraction that forces the selected adjacent ones of the overlapping strips together thereby increasing the frictional forces between the selected adjacent ones of the overlapping strips such that the selected strips are not substantially slideable relative to one another thereby rigidizing a portion of the inner tube adjacent the selected strips.

29. The method as recited in claim 27, wherein one or both of the inner and outer tubes include electrodes and wherein an electrical source is arranged to selectively apply an electrostatic potential to selected ones of the electrodes thereby generating an electric field across associated ones of the overlapping strips.

30. The method as recited in claim 25, further comprising elevating the pressure within the inner lumen to longitudinally expand the inner tube and thereby the device.

31. The method as recited in claim 30, further comprising sequentially rigidizing the scale-like strips along a length of the device such that the device may be advanced with a snake-like locomotion scheme in which the scale-like strips are advanced through the bend in the device in small discrete steps such that the absolute location of the bend remains fixed while the device is advanced through the bend.

32. A method of steering an articulatable device at a predetermined region along the length of the device, comprising:
    selectively rigidizing a portion of the device adjacent the predetermined region, and
    elevating the pressure within an inner lumen of the device such that a portion of the device diametrically opposite the rigidized portion expands while the rigidized portion is substantially prevented from expanding, thereby bending the device at the predetermined region.

* * * * *